March 29, 1966 MASATOSHI MIGITAKA 3,243,322

TEMPERATURE COMPENSATED ZENER DIODE

Filed Nov. 12, 1963

INVENTOR.
Masatoshi Migitaka
BY
Mestern & Mestern

United States Patent Office 3,243,322

Patented Mar. 29, 1966

3,243,322

TEMPERATURE COMPENSATED ZENER DIODE

Masatoshi Migitaka, Kitatama-gun, Tokyo-to, Japan, assignor to Kabushiki Kaisha Hitachi Seisakusho, Tokyo-to, Japan, a joint-stock company of Japan Filed Nov. 12, 1963, Ser. No. 322,631
Claims priority, application Japan, Nov. 14, 1962, 37/49,888
1 Claim. (Cl. 148—33.5)

Figure 1A:
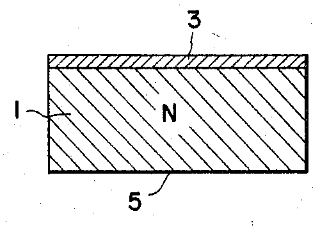

This invention relates to Zener diodes, and more particularly it relates to a Zener diode element of temperature compensated type having a very small ratio of voltage to temperature of Zener voltage variation.

The ratio of voltage to temperature of the breakdown voltage (known also as the Zener voltage) of a Zener diode is herein understood to be the ratio of any change $\Delta Vz$ (volt) in the Zener voltage to a change $\Delta t$ (deg. C.) in the junction temperature, that is, the ratio $\Delta Vz/\Delta t$, for a constant Zener current.

In a conventional Zener diode of low ratio of voltage to temperature, its temperature coefficient varies with the junction current and ambient temperature. Accordingly, it is known that, for making a Zener diode which constantly has a low ratio of voltage to temperature, a desirable construction is that two junctions and one junction are connected in series, respectively in the forward and reverse directions, so as to cancel the ratio of voltage to temperature of the one junction in the reverse direction with the ratio of voltage to temperature of the two junctions connected in the forward direction.

For obtaining such a construction, the method widely practiced heretofore has comprised first preparing three Zener diode elements separately, measuring the ratio of voltage to temperature of each element, then selectively combining the three Zener diode elements so that the sum of the ratios of voltage to temperature in the forward direction of two of the elements may be approximately equal, as an absolute value with opposite sign, to the ratio of voltage to temperature in the reverse direction of the other one element.

In the case of the above-described construction and method, the production process requires a large number of steps and an extremely high degree of technical skill and, therefore, is not adaptable to mass production. Furthermore, since the three junctions formed are mutually independent, a relatively long time is required for the temperatures between the junctions to gain equilibrium, therefore, the transient characteristics are poor. By the above-described construction, moreover, the finished diode tends to be of relatively large size.

It is an object of the present invention, in its broad aspect, to eliminate the above-described disadvantages of the known construction and method. More specifically, it is an object to provide a new Zener diode of temperature compensated type having a very small ratio of voltage to temperature, highly improved transient characteristics, and a unique, simple construction.

It is another object of the invention to provide a simple method for producing the above-stated Zener diode according to the invention, the said method requiring few process steps and being suitable for mass production.

The foregoing objects have been achieved by the present invention, which, briefly described, provides a Zener diode produced by clamping, between one wafer of a single-crystal semiconductor and one wafer of a single-crystal semiconductor on one surface of which an impurity has been diffused, a foil of an impurity metal such as will impart a conductivity type which is different from that of the said single-crystal semiconductor wafer or of a metal containing the said impurity metal and then subjecting the resulting laminated assembly to an alloying process, whereby a diode having a construction wherein three Zener diodes exist as an integral structure is obtained.

Figure 1B:
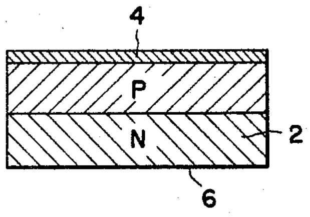
Figure 3:
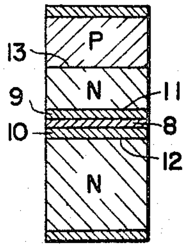

The specific nature and details of the invention will be more clearly apparent by reference to the following description of a preferred embodiment of the invention when taken in conjunction with accompanying drawing in which:

FIGURES 1(*a*), 1(*b*), and 2 are diagrammatic sectional views indicating steps in the production of the Zener diode according to the invention; and FIGURE 3 is a diagrammatic sectional view showing the vertical section of the completed diode according to the invention.

Figure 2:
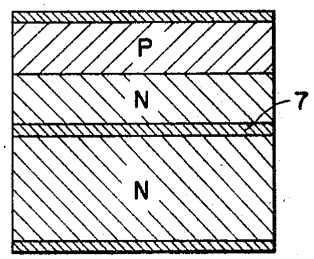

Referring first to FIGURE 1, an n-type silicon wafer 1 of a resistivity of approximately 0.04 ohm-cm. and a silicon wafer 2 having a pn junction obtained by diffusing boron in one surface of a wafer similar to the aforesaid n-type silicon wafer 1 are prepared. Next, the two silicon wafers 1 and 2 are provided on one surface thereof with nickel plating 3 and 4, respectively, for electrodes, the plating 4 being deposited on the surface of the p-type region of the wafer 2. Then the surfaces 5 and 6, which are not plated, of the two wafers are chemically etched. Thereafter, a gold foil 7, as shown in FIGURE 2, containing 1 percent of gallium and having a thickness of approximately 50 microns is clamped in a sandwiched arrangement between the two wafers in contact with the etched surfaces thereof. Next, the resulting laminated assembly is subjected to an alloying process, after which it is cut by means of an ultrasonic cutter into elements of the required size. Thus, Zener diode elements without electrodes are obtained. One such element is shown in section in FIGURE 3, in which reference numeral 8 designates a eutectic layer of the metal and semiconductor, numerals 9 and 10 designate regrowth p-type layers, and numerals 11, 12, and 13 designate junctions.

A Zener diode element of the present invention obtained in the above-described manner is capable of operating as a temperature compensated type Zener diode having a ratio of voltage to temperature of 0.00018 volt/deg. C. or less.

By the construction and method for production of the Zener diode according to the present invention, three junctions exist within a single element and, moreover, are in mutually close proximity. For this reason, the temperature differences between the junctions are small, and, since the element can be made small in accordance with necessity, the heat capacity can be made low, whereby the transient characteristics can be greatly improved over those heretofore attainable. Furthermore, since the manufacturing process requires only a few steps which are simple, it is suitable for mass production.

Although in the above-described embodiment of the invention, an n-type silicon is used for the semiconductor wafers, it is not to be so limited, it being obvious that semiconductors of other types (for example: germanium and group III and group V compound semiconductors) are also usable for this purpose. Furthermore, the metal foil need not be limited to gold.

Thus, although this invention has been described with respect to a particular embodiment thereof, it is not to be so limited as changes and modifications may be made therein which are within the full intended scope of the invention, as defined by the appended claim.

What is claimed is:

A temperature compensating Zener diode comprising, in combination, a silicon semiconductor junction in which there is a conductivity layer of the p-type and an n-type layer; with another p-type layer adjacent to said n-type layer having gallium diffused therein; and a layer of gold bonded to one side of said gallium-containing layer; with a p-type layer attached to the opposite side of said gold layer; and another n-type silicon layer adjacent to said p-type layer at said opposite side; said layers being bonded in the sequence named so as to form an integral structure.

References Cited by the Examiner

UNITED STATES PATENTS

| | | | |
|---|---|---|---|
| 2,779,877 | 1/1957 | Lehovec | 148—33.5 |
| 2,878,152 | 3/1959 | Runyan | 148—33.5 |
| 2,959,504 | 11/1960 | Ross | 14—33.5 |
| 2,967,793 | 1/1961 | Philips | 148—33.5 |
| 2,998,334 | 8/1961 | Bakalar | 148—178 |
| 3,009,840 | 11/1961 | Emeis | 148—185 |
| 3,014,819 | 12/1961 | Hunter | 148—177 |
| 3,035,213 | 5/1962 | Schmidt | 148—33.5 |
| 3,043,726 | 7/1962 | Jochems | 148—177 |
| 3,069,603 | 12/1962 | Hunter | 148—33.5 |
| 3,140,963 | 7/1964 | Svedberg | 148—33.5 |

HYLAND BIZOT, *Primary Examiner.*